US008343395B2

(12) United States Patent
Hu et al.

(10) Patent No.: US 8,343,395 B2
(45) Date of Patent: Jan. 1, 2013

(54) POWDER PARTICLE SHAPING DEVICE AND METHOD

(76) Inventors: Xinyu Hu, Beijing (CN); Xijun Hu, Beijing (CN)

( * ) Notice: Subject to any disclaimer, the term of this patent is extended or adjusted under 35 U.S.C. 154(b) by 0 days.

(21) Appl. No.: 13/283,579

(22) Filed: Oct. 28, 2011

(65) Prior Publication Data

US 2012/0043685 A1 Feb. 23, 2012

Related U.S. Application Data

(63) Continuation of application No. PCT/CN2010/076119, filed on Aug. 18, 2010.

(51) Int. Cl.
*B29B 9/16* (2006.01)

(52) U.S. Cl. ........... 264/15; 264/140; 264/162; 264/340

(58) Field of Classification Search ........................ None
See application file for complete search history.

(56) References Cited

U.S. PATENT DOCUMENTS

| | | | | |
|---|---|---|---|---|
| 4,559,194 A * | 12/1985 | Hegenstaller | ................. | 264/113 |
| 5,684,076 A | 11/1997 | Takahashi | | |
| 6,318,986 B1 * | 11/2001 | Hinzmann et al. | .............. | 425/78 |
| 7,115,221 B1 * | 10/2006 | Spahr et al. | ...................... | 264/15 |
| 2008/0193580 A1 * | 8/2008 | Hall et al. | ........................ | 425/77 |

FOREIGN PATENT DOCUMENTS

| | | |
|---|---|---|
| CN | 1436624 A | 8/2003 |
| CN | 1863628 A | 11/2006 |
| CN | 101193715 A | 6/2008 |
| CN | 201183120 Y | 1/2009 |

* cited by examiner

*Primary Examiner* — Mary F Theisen
(74) *Attorney, Agent, or Firm* — Winston Hsu; Scott Margo

(57) ABSTRACT

A powder particle shaping device includes a closed cavity capable of changing between multiple shapes as an external pressure changes, and the closed cavity compresses and moves powder particles with which the closed cavity is filled full while the shape changes. A powder particle shaping method is further provided, which includes a. filling a cavity full with powder particles to be shaped; and b. applying a varying external pressure to make the cavity change repeatedly between multiple shapes, thereby making the powder particles under compression move and be subject to friction, where the cavity is kept in a closed state during an effective processing process. The shaping device and method have highly controllable shaping processing intensity of powder particles and stable processing strength, and thus are applicable to shaping and pulverization of various powder particles, and also applicable to pulverization and further shaping processing of dispersed agglomerates.

23 Claims, 4 Drawing Sheets

POWDER PARTICLE SHAPING DEVICE AND METHOD

CROSS REFERENCE TO RELATED APPLICATIONS

This application is a continuation of PCT/CN2010/076119, filed on Aug. 18, 2010. The contents of PCT/CN2010/076119 are all hereby incorporated by reference.

BACKGROUND

1. Technical Field

The present application relates to morphological control of powder particles, and more particularly to a powder particle shaping device and method.

2. Related Art

Morphological control of powder particles, being one content of powder engineering, is processing of external surface of powder particles with an intended objective, to achieve a special individual or overall function of the powder particles. Relatively spheroidized powder particles can improve the tap density, filling density, and fluidity of the powder, for example, the spheroidization of cement powder particles can improve the performance of cement, the spheroidization of metal ink particles can increase the light reflection degree, and improve the print quality, and the spheroidized copper powder, graphite, and tin powder exhibit advantages in specific application fields thereof. Shaping of the powder particle is an intermediate step to improve the final performances of some products, and also an auxiliary method for modification processing of the powder particles.

There are many methods for surface shaping or morphological control of the powder, and the conventional mechanical shaping method generally including compacting, rolling, ball milling, and vibration grinding. The compacting includes placing a powder in an annular groove, and compacting the packed powder by rotating a driven round roller about a central axis. The rolling includes dropping agglomerates of power between rollers parallel to each other and having gaps therebetween for pulverization and shaping. Ball milling includes placing a powder and harder and abrasion-tolerant grinding balls mixed at a certain ratio in a rolling drum, and rotating the drum about an axis, so that the grinding balls in the rolling drum rise and fall with the rotation of the drum body, and thus the powder is impacted, and interaction force and mutual friction occur between particles. The vibration grinding is similar to the ball milling, except that a vibration drum body reciprocates along a single direction at a certain frequency, so that the grinding balls impact and grind the powder particles. Recently, a patent issued to Tsinghua University discloses a method and device for spheroidization or morphological control of a powder by high-speed pounding and shearing.

The compacting, rolling, vibration grinding, and ball milling all have disadvantage that the mixture of the processed powder and the grinding media partially contacts air in an effective processing stage, that is, there is “open” or “partial open” situation. In processing of the powder particles, the pressure or impact force is released or partially released. For the relatively “soft” or “hard” powder particles, the absolute strength for processing is limited, and the expected effect and efficiency aredifficult to be achieved. In addition, non-cyclic ball milling and vibration grindingboth have the problem of separation of the milling balls from the ground powder, andthe processing strength varies with the increasing abrasion of the grinding balls, thisincurs uncertainty to the processing process. Moreover, the problems of noise andwaste of energy for driving the equipment and the grinding balls to vibrate or rotateare difficult to overcome. Among the disadvantages, the most serious is the limitedcontrollability of the processing intensity.

SUMMARY

In view of the disadvantages in the prior art, the present application is mainly directed to a powder particle shaping device and method having highly controllable processing intensity and stable processing strength.

In order to achieve the above objectives, the present application provides a powder particle shaping device, which includes a closed cavity capable of changing between multiple shapes as an external pressure changes, and the closed cavity compresses and moves powder particles with which the closed cavity is filled full while the shape of the closed cavity changes.

Preferably, the closed cavity has a piston structure extending from the exterior to the interior thereof, and the piston structure includes at least two pistons acting independently.

In order to achieve the above objectives, the present application further provides a powder particle shaping method, which includes:

a. filling a closed cavity full with powder particles to be shaped; and b. applying a varying external pressure to the closed cavity, such that the closed cavity changes repeatedly between multiple shapes, thereby making the powder particles under compression move and be subject to friction, where “closed” refers to that the cavity is kept in a closed state during an effective processing process.

Preferably, the closed cavity has a piston structure extending from the exterior to the interior thereof, the piston structure includes at least two pistons acting independently, and Step b includes:

applying different pressures respectively to the at least two independent pistons while an internal pressure of the closed cavity is maintained, so that one part of the pistons are pressed toward the interior of the closed cavity, and the other part of the pistons are pushed outward, then reversing the process, and implementing multiple cycles, till a shaping requirement of the powder particles is met.

According to the device and method of the present application, combined actions of several pistons or similar piston assemblies forming the closed cavity are caused through the change of the shape of the closed cavity, and typically by controlling the external forces, so that the powder particles with which the cavity is filled full are compressed, and the cavity space and relative positions of the powder particles therein change. As the processed material is closed in the cavity and cannot be released, the powder particles are compressed in all directions, and sheared, and thus mutual friction occurs between particles, thereby removing edge angles and burrs from the surfaces of the particles, achieving the purpose of pulverizing, shaping, or spheroidizing the powder particles, and realizing the morphological control of the powder particles in the cavity.

Different from the conventional “cold processing” with high-speed impact and shearing, the present application can maintain the original property of the processed material, while the disadvantages of other powder processing manners such as rolling, ball milling, and vibration grinding are well overcome, so as to improve the control on factors affecting the processing effect, and especially the controllability of the processing intensity. In processing of the powder particles, there is no situation of "open" or "partial open", and the pressure or impact force is persistently maintained at a stable and effective level.

Compared with the conventional solution, the present application has high processing controllability, well adapts to the processed objectives (in respect of the particle size and hardness), and saves space, improves the efficiency, and reduces noise pollution and energy consumption. In addition, the material of the device useful in the present application can be widely selected and is economical, and automatic mass production can be achieved while the given processing objective is achieved. The present application is a preferred choice for shaping or spheroidizing the powder particles, and also can effectively realize forced pulverization and deep grinding of the powder.

Hereinbefore, the features and technical advantages of the present application are widely described, for better understanding the detailed description of the present application. Other features and advantages of the present application are described below. It can be understood by those skilled in the art that, the same objectives of the present application may be easily achieved by modifying or designing other structures based on the disclosed concepts and specific embodiments. It should also be aware to those skilled in the art that, the equivalent structures do not deviate from the spirit and scope of the present application. Novel characteristics considered as features of the present application, structures and operation methods, and further objectives and advantages will be better understood through the description below and accompanying drawings. However, it should be deeply understood that each feature is provided for description and illustration only, but not intended to limit the scope of the present application.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The present application is further described in detail with reference to embodiments and accompanying drawings.

Figure 1A:
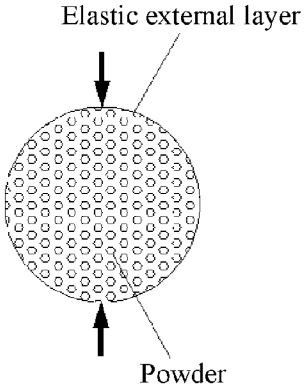
FIGS. 1a to 1c are schematic views of shape change of a powder particle shaping device under ideal conditions according to an embodiment of the present application.
Figure 1B:
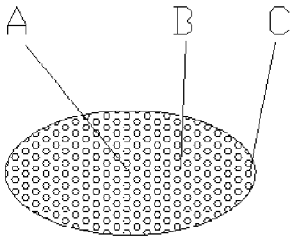
Figure 1C:
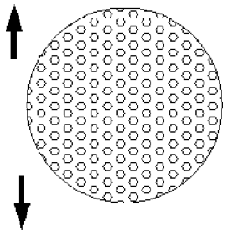

As shown in FIGS. 1a-1c, an embodiment shows basic principles of the present application.

As shown in FIG. 1a, a powder particle shaping device uses a closed ideal elastic cavity, and the powder particles are enclosed in the elastic cavity. In an initial state, the powder particles are only compressed by an enclosure force. The same pressure is applied at a top and a bottom of the cavity, the elastic cavity deforms horizontally (or even expands), and changes from a spherical shape to an ellipsoidal shape as shown in FIG. 1b. As shown in FIG. 1c, when the external force is released, the elastic cavity is restored to an original shape.

In the cycle, the powder particles at different positions in the cavity are compressed in multiple directions; at the same time, due to the cavity deformity (or plus the volume change), relative movements, and thus friction and shearing occur between adjacent powder particles, although the compression and friction degree may be different at different positions (for example, three points A, B, and C in FIG. 1b) in the cavity. The processing effect of the powder particles depends on the enclosure force of the elastic external layer and the deformity degree, and rate caused by the external pressure, which are all controllable.

Based on the principles above, the present application may be implemented with an embodiment different from the elastic cavity if the following conditions are satisfied.

1) The deformity of the elastic cavity can be simulated.

2) The acting force in the cavity can be adjusted.

3) The assembly material is reliable and durable relative to the processed material (the powder particles, or a mixture of the powder particles and other media).

Typically, a powder particle shaping device includes several assemblies capable of acting independently and forming a closed cavity. Combined actions of the several assemblies are controlled, so that space occupied by a processed material in the cavity is compressed, and powder particles (or a mixture of the powder particles with an auxiliary medium) with which the cavity are filled full are under compression. Actions and states of the assemblies contacting the powder particles are controlled, such that relative movements occur between the powder particles under compression in the cavity, and the cavity space and relative positions of the powder particles therein are changed, thereby causing persistent compression and friction between the powder particles.

The number of the assemblies contacting the powder particles may be changed and states thereof are controlled by, for example, controlling forces applied to the assemblies, and the movement, and movement direction of the assemblies, or rotating and deforming the assemblies, so that space (size and shape) occupied by powder particles in the cavity and relative positions of the powder particles change, thereby causing persistent relative movement and interaction between particles. The forces applied to the assemblies are preset controllable external forces, which make the compression force applied to the powder particles adjustable, and thus the compression and friction strength can be controlled.

A stirrer is preferably disposed in the closed cavity, such that the powder particle in the cavity can be equally uniformly processed.

In a preferred embodiment, the closed cavity has a piston structure extending from the exterior to the interior thereof, and the piston structure includes at least two independent pistons.

It should be noted that term "closed" used herein means that the configuration of the cavity can prevent the leakage of the processed material which has substantial influence on the processing. For example, for the above preferred embodiment and more preferred embodiments below, if the particle surface is rough, effective processing can be achieved by properly controlling the movement speed of the piston, even if the cylinder block is not completely closed.

Figure 2:
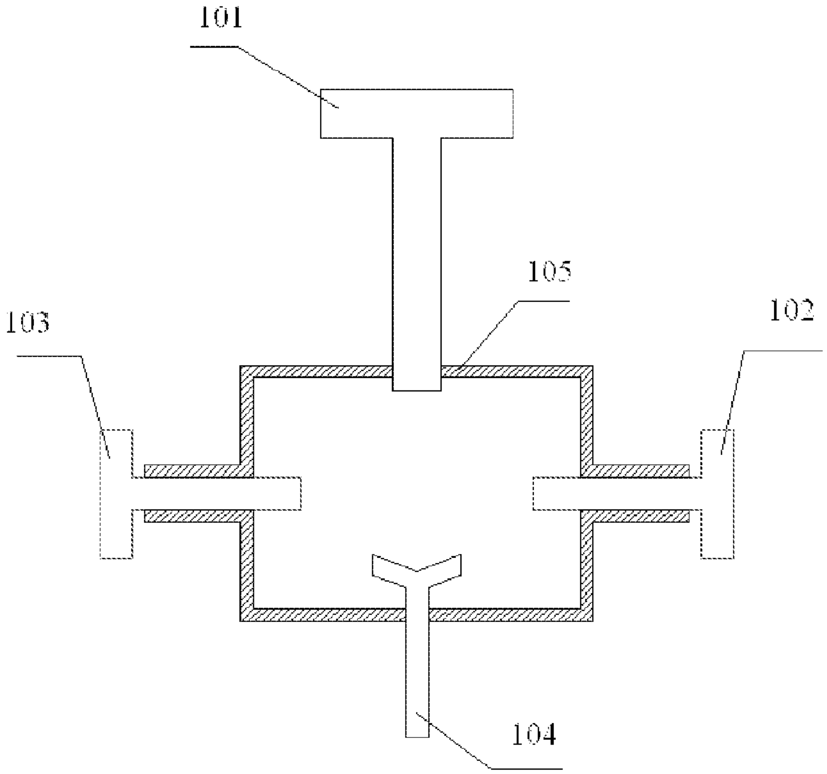
FIG. 2 is a schematic structural view of a powder particle shaping device according to another embodiment of the present application.
Figure 3:
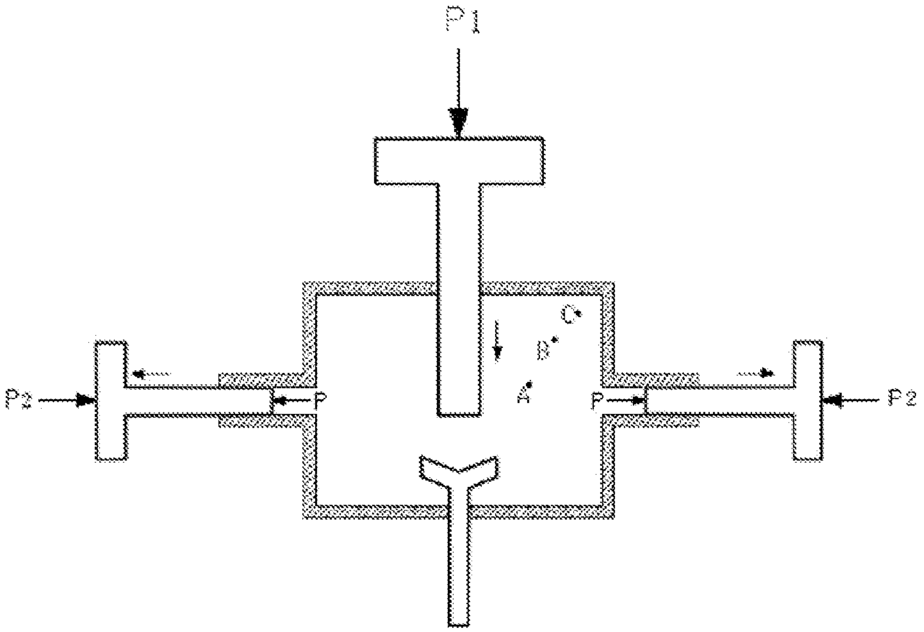
FIG. 3 is a schematic view of actions of the powder particle shaping device as shown in FIG. 2 in a stressed state.
Figure 4:
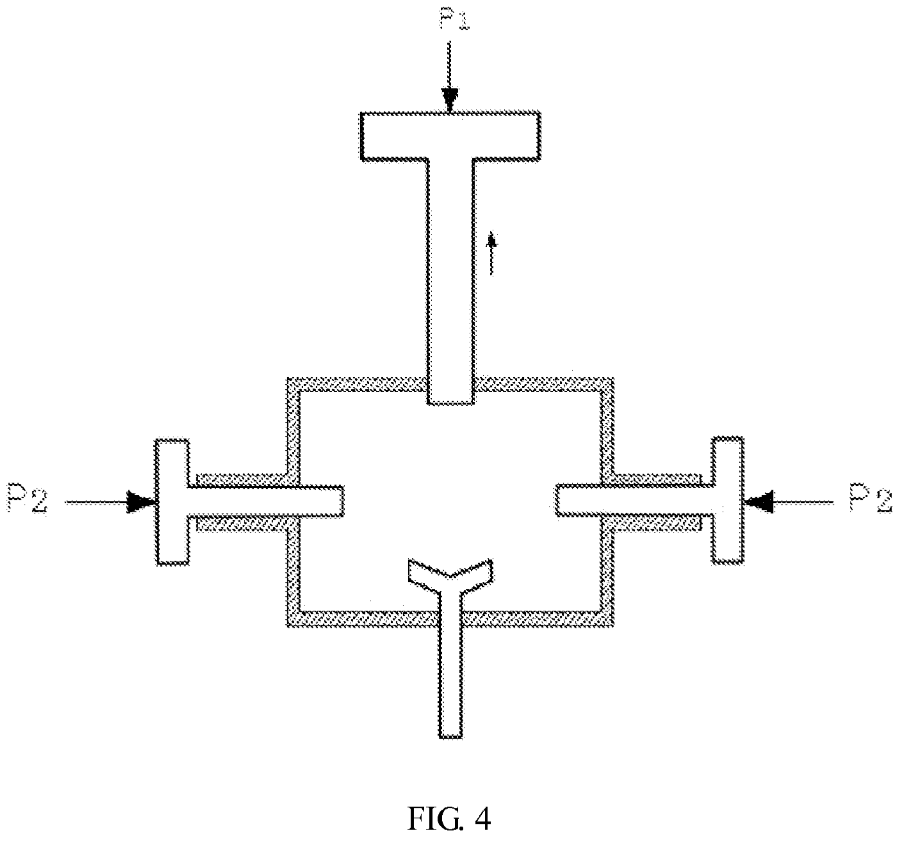
FIG. 4 is a schematic view of actions of the powder particle shaping device as shown in FIG. 2 in another stressed state.
Figure 5:
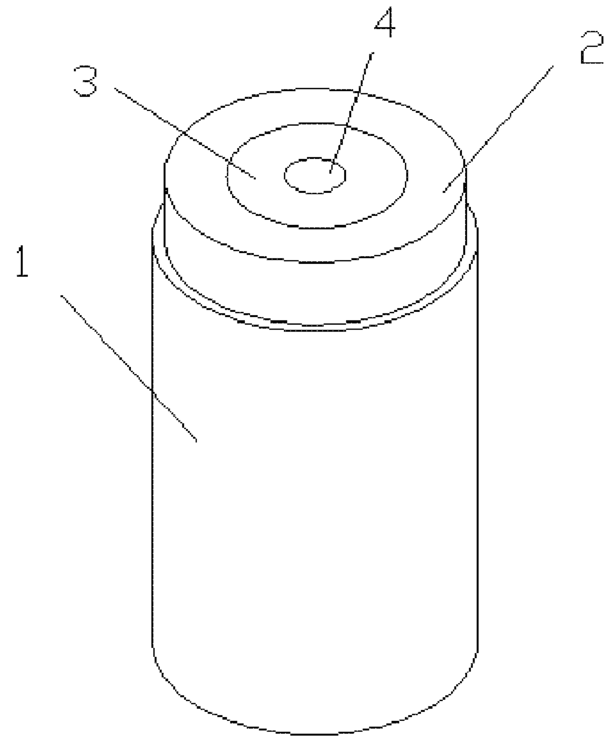
FIG. 5 is a schematic structural view of a powder particle shaping device according to another embodiment of the present application.

As shown in FIGS. 2 to 4, in a more preferred embodiment, the closed cavity includes a cylinder block 105 and first to third piston assemblies 101-103 mounted in a piston manner on the cylinder block 105, in which movement of a piston of the first piston assembly 101 is positioned in a first direction (a vertical direction in the figure), movement of pistons of the second piston assembly 102 and the third piston assembly 103 is oppositely positioned in a second direction (a horizontal direction in the figure), and the first direction is substantially perpendicular to the second direction. More preferably, the closed cavity further includes a stirrer 104 disposed in the cylinder block. The assemblies each have a smooth contact surface, and keep rigid in the whole processing cycle. Definitely, the first to third piston assemblies 101-103 acting as pistons, the stirrer 104, and the cylinder block 105 are sealed with respect to the processed material.

Effective shaping of powder particles by using the device according to the above embodiment is described below.

1. As shown in FIG. 2, in an initial state, the material is closely positioned in the cylinder block 105, a certain pressure is maintained in the cylinder block, and preferably, there is no air in the cylinder block, at least, as less as possible.

2. As shown in FIG. 3, when the processed material is effectively compressed, and P1>P>P2 (P1 is an external pressure applied to the first piston assembly 101, P is a resistance force in the interior of the cylinder block, P2 is an external pressure applied to the second piston assembly 102) is satisfied, the first piston assembly 101 moves downward under P1, and the material particles in the cylinder block are compressed, but there is no space for releasing the pressure. As the pressure P is transferred by the material particles to the second and third piston assemblies 102 and 103 contacting the material particles in the cylinder block, such that the second and the third piston assemblies 102 and 103 overcome P2 respectively and move outward.

In the process, when the material particles in the cylinder block are under pressure, the space accommodating the material particles changes due to the relative movement of the assemblies, and thus the material particles are forced to move to adapt to the change, and the movement is different due to the difference of the positions (e.g. three positions A, B, and C as shown in FIG. 3) of the material particles in the cylinder block. As the material particles in the cylinder block consecutively contact with each other, differences exist in movement directions and movement speeds, and thus the particles are effectively subject to compression and friction.

3. As shown in FIG. 4, when the assemblies move to certain positions, the pressures applied on each piston assembly is changed, so that P2>P>P1 is satisfied. As a result, the second and the third piston assemblies 102 and 103 move toward the interior of the cylinder block and push the first piston assembly 101 to return to a starting position, so far, a processing cycle is completed. In this process, the powder particles in the cylinder block are also under actions of the pressure, shearing force, and friction.

Preferably, in order to equally process the particles in the cylinder block, during the processing of Steps 2 and 3, material particles are stirred by the stirrer 104.

4. The processing of Steps 2 and 3 are cycled for many times as desired, till a shaping requirement of the powder particles is met.

In the above design, the principles of the present application is used to approximately simulate the effect of the elastic cavity according to the embodiment. The movements of the first piston assembly 101 are corresponding to the upward and downward external forces in the "principles", and the second and the third piston assemblies 102 and 103 function to make the cavity have changeable "elasticity". During effective processing, the space of the closed cavity formed by the assemblies and for accommodating the processed material changes substantially, the powder particles in the cavity are forced to flow, and the external pressures are maintained on the first to third piston assemblies 101-103, so a pressure is maintained in the cavity.

The external pressures P1 and P2 are manually adjustable, and thus the processed material is subject to friction under a controllable pressure.

It should be noted that, although the final processing object is individual powder particles, the processing is actually directly performed on the individual powder particles contacted with each other, or a mass or a part of the mass formed by the individual powder particles with other media. Effective processing means the compression and friction of the processed powder particles under forces other than gravity.

As shown in FIGS. 5 to 11, in another more preferred embodiment, the closed cavity includes a cylindrical container 1 having an opening at one end, and an external movable assembly 2 and an internal movable assembly closing the opening of the container, in which the external movable assembly includes a hollow cylinder sleeved in a piston manner between the cylindrical container 1 and the internal movable assembly, and the internal movable assembly includes a cylinder sleeved in a piston manner in the external movable assembly 2. More preferably, the internal movable assembly includes a first movable assembly 3 and a second movable assembly 4, in which the first movable assembly 3 is a hollow cylinder sleeved in a piston manner between the external movable assembly 2 and the second movable assembly 4, and the second movable assembly is a cylinder sleeved in a piston manner in the first movable assembly 3.

Effective shaping processing of the powder particles by using the device according to the above embodiment is described below.

Figure 6:
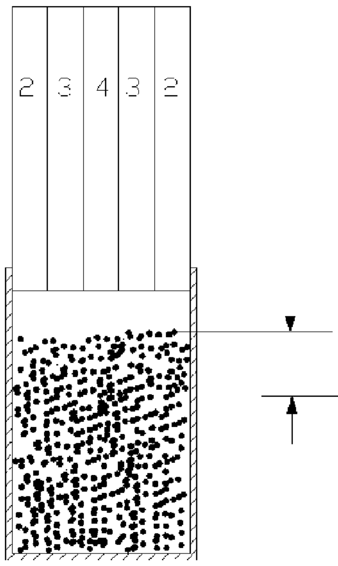
FIGS. 6 and 7 are schematic views of achieving a pressure in a container by the powder particle shaping device as shown in FIG. 5 at an initial processing stage.
Figure 7:
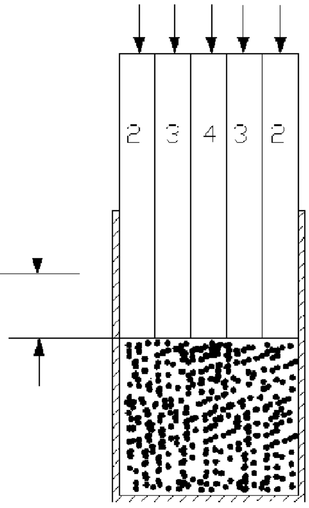

1. As shown in FIGS. 6 and 7, the external movable assembly 2 and the internal movable assembly are pressed into the cylindrical container 1 through the opening of the container, form a closed cavity with respect to the processed material, and continuously move downward, till the cavity filled full with the material has a certain pressure.

Figure 8:
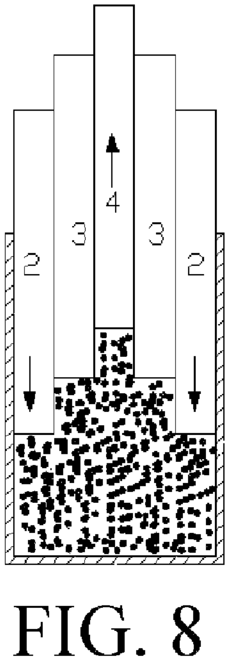
FIG. 8 is a schematic view of actions of the powder particle shaping device as shown in FIG. 5 in a stressed state.

2. The magnitude of the pressure applied to each movable assembly is adjusted, such that each movable assembly moves with respect to each other, while the pressure in the cavity is kept to be not lower than a certain value, and changeable. As shown in FIG. 8, a high pressure is applied to the external movable assembly 2, and low pressures are applied to the first movable assembly 3 and the second movable assembly 4, such that the external movable assembly 2 is pressed toward the interior of the cavity, and the first movable assembly 3 and the second movable assembly 4 are pushed outward. The external pressures applied to the first movable assembly 3 and the second movable assembly 4 may be identical or different, for example, the external pressure applied to the second movable assembly 4 is lower.

Figure 9:
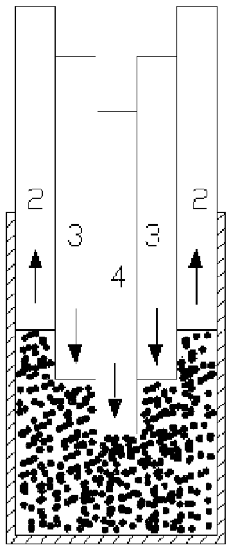
FIG. 9 is a schematic view of actions of the powder particle shaping device as shown in FIG. 5 in another stressed state.

3. As shown in FIG. 9, while an internal pressure is kept in the cavity, high pressures are applied to the first movable assembly 3 and the second movable assembly 4, and low pressure is applied to the external movable assembly 2, so that the external movable assembly 2 is pushed outward, and the first movable assembly 3 and the second movable assembly 4 are pressed toward the interior of the cavity. The pressures applied to the first movable assembly 3 and the second movable assembly 4 may be identical or different, for example, the external pressure applied to the second movable assembly 4 is higher.

4. The processing Steps 2 and 3 are cycled for many times as desired, till a shaping requirement of the powder particles is met. In order to uniformly process the powder particles, a stirrer may be added.

Figure 10:
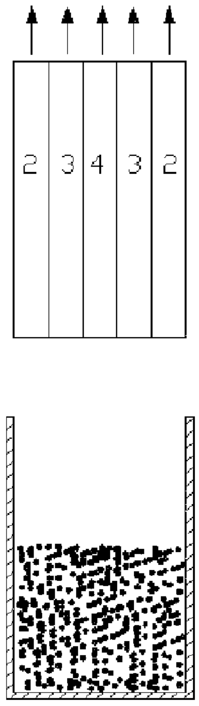
FIG. 10 is a schematic view of withdrawing movable assemblies after shaping with the powder particle shaping device as shown in FIG. 5 is completed.
Figure 11:
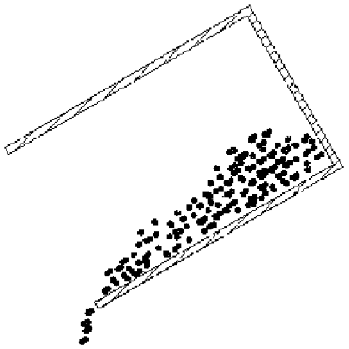
FIG. 11 is a schematic view of decanting materials after the shaping with the powder particle shaping device as shown in FIG. 5 is completed.

5. As shown in FIGS. 10 and 11, after processing, the movable assemblies on the drum are withdrawn, and the shaped material is decanted.

In some embodiments, the device of the present application may be further equipped with a cooler, to dissipate friction-incurred heat, so as not to change the property of the processed powder.

In some embodiments, the device of the present application may be further equipped with a thermal insulator, so that the device can work in a heat preserved state, which is applicable when the powder is required to be processed at a certain temperature.

The design embodying the principles of the present application is not limited to the above embodiments. The number of the assemblies may be increased, and the sizes, shapes, and operations (including rotation, movement directions, and deformity of the assemblies) of the assemblies may be changed, so as to increase the probability of relative movement between the powder particles in the cavity, thereby fully exerting the advantages of the present application, improving the work efficiency and effects, and increasing the applicability.

The present application further provides a powder particle shaping method, which includes:

a. filling a closed cavity full with powder particles to be shaped; and b. applying a varying external pressure to the closed cavity, such that the closed cavity changes repeatedly between multiple shapes, thereby making the powder particles be subject to compression and friction.

In a preferred embodiment, the adopted closed cavity has a piston structure extending from the exterior to the interior thereof, the piston structure includes at least two pistons acting independently, and Step b includes:

applying different pressures respectively to the at least two independent pistons while an internal pressure of the closed cavity is maintained, so that one part of the pistons are pressed toward the interior of the closed cavity, and the other part of the pistons are pushed outward, then reversing the process, and implementing multiple cycles, till a shaping requirement of the powder particles is met.

It can be understood by those skilled in the art that, multiple more preferred embodiments of the embodiments of the present application are already specifically embodied in the processing process in the above device embodiments.

The device and method of the present application are applicable to shaping and pulverization of various powder particles including cement powder particles, iron powder, copper powder, and iron alloy powder, and also applicable to pulverization and further shaping processing of dispersed agglomerates. Compared with powder particles having high elasticity, the present application has a better processing effect on the powder particles having low elasticity and high rigidity.

Although the present application and advantages thereof are described in detail, it should be understood that various changes, replacements, and modification can be made without departing from the spirit and scope of the present application. In addition, the application scope of the present application is not limited to specific embodiments of the processes, devices, manufacturing, material composition, manners, methods, and steps described in the specification. Based on the disclosure of the present application, persons skilled in the art can easily make use of the existing or future developed processes, devices, manufacturing, material composition, manners, methods, and steps, which essentially implement the same functions or achieve the same results of the corresponding embodiments described herein. Therefore, the attached claims are intended to include the processes, devices, manufacturing, material composition, manners, methods, and steps.

What is claimed is:

1. A powder particle shaping device, comprising a closed cavity capable of changing between multiple shapes as an external pressure changes, wherein the closed cavity compresses and moves powder particles with which the cavity is filled full while the shape changes repeatedly, so as to realize morphological control of the powder particles.

2. The powder particle shaping device according to claim 1, wherein the closed cavity is an elastic body having shapes changed between a spherical shape and an ellipsoidal shape.

3. The powder particle shaping device according to claim 1, wherein the closed cavity has a piston structure extending from the exterior to the interior thereof, and the piston structure comprises at least two pistons acting independently.

4. The powder particle shaping device according to claim 3, wherein the closed cavity comprises a cylinder block and first to third piston assemblies mounted in a piston manner on the cylinder block, movement of a piston of the first piston assembly is positioned in a first direction, movement of pistons of the second piston assembly and the third piston assemblies is oppositely positioned in a second direction, and the first direction is substantially perpendicular to the second direction.

5. The powder particle shaping device according to claim 4, wherein the closed cavity further comprises a stirrer mounted in the cylinder block.

6. The powder particle shaping device according to claim 3, wherein the closed cavity comprises a cylindrical container having an opening at one end, and an external movable assembly and an internal movable assembly closing the opening of the container, the external movable assembly comprises a hollow cylinder sleeved in a piston manner between the cylindrical container and the internal movable assembly, and the internal movable assembly comprises a cylinder sleeved in a piston manner in the external movable assembly.

7. The powder particle shaping device according to claim 6, wherein the internal movable assembly comprises a first movable assembly and a second movable assembly, the first movable assembly is a hollow cylinder sleeved in a piston manner between the external movable assembly and the second movable assembly, and the second movable assembly is a cylinder sleeved in a piston manner in the first movable assembly.

8. A powder particle shaping method, comprising:

a. filling a closed cavity full with powder particles to be shaped; and b. applying a varying external pressure to the closed cavity, such that the closed cavity changes repeatedly between multiple shapes, thereby making the powder particles under compression move and be subject to friction, so as to realize morphological control of the powder particles.

9. The powder particle shaping method according to claim 8, wherein:

the closed cavity has a piston structure extending from the exterior to the interior thereof, the piston structure comprises at least two pistons acting independently, and Step b comprises:

applying a pressure respectively to the at least two independent pistons while an internal pressure of the closed cavity is maintained, so that one part of the pistons are pressed toward the interior of the closed cavity, and the other part of the pistons are pushed outward, then reversing the process, and implementing multiple cycles, till a shaping requirement of the powder particles is met.

10. The powder particle shaping method according to claim 9, wherein:

the closed cavity comprises a cylinder block and first to third piston assemblies mounted in a piston manner on the cylinder block, movement of a piston of the first piston assembly is positioned in a first direction, movement of pistons of the second piston assembly and the third piston assembly is oppositely positioned in a second direction, and the first direction is substantially perpendicular to the second direction; and Step b comprises:

b1. applying different pressures to the first to third piston assemblies while an internal pressure of the cylinder block is maintained, so that the first piston assembly is pressed toward the interior of the cylinder block, and the second and the third piston assemblies are pushed outward;

b2. applying different pressures to the first to third piston assemblies while the internal pressure of the cylinder block is maintained, so that the second and the third piston assemblies are pressed toward the interior of the cylinder block, and the first piston assembly is pushed outward; and cycling Steps b1 and b2 for many times, till the shaping requirement of the powder particles is met.

11. The powder particle shaping method according to claim 10, wherein Step b further comprises stirring the powder particles by using a stirrer disposed in the cylinder block.

12. The powder particle shaping method according to claim 9, wherein:

the closed cavity comprises a cylindrical container having an opening at one end, and an external movable assembly and an internal movable assembly closing the opening of the container, the external movable assembly comprises a hollow cylinder sleeved in a piston manner between the cylindrical container and the internal movable assembly, and the internal movable assembly comprises a cylinder sleeved in a piston manner in the external movable assembly; and Step b comprises:

b3. applying different pressures to the external movable assembly and the internal movable assembly while an internal pressure of the container is maintained, so that the external movable assembly is pressed toward the interior of the container and the internal movable assembly is pushed outward;

b4. applying different pressures to the external movable assembly and the internal movable assembly while the internal pressure of the container is maintained, so that the internal movable assembly is pressed toward the interior of the container and the external movable assembly is pushed outward; and cycling Steps b3 and b4 for many times, till the shaping requirement of the powder particles is met.

13. The powder particle shaping method according to claim 8, wherein an auxiliary medium for shaping is added to the powder particles.

14. The powder particle shaping method according to claim 9, wherein an auxiliary medium for shaping is added to the powder particles.

15. The powder particle shaping method according to claim 10, wherein an auxiliary medium for shaping is added to the powder particles.

16. The powder particle shaping method according to claim 11, wherein an auxiliary medium for shaping is added to the powder particles.

17. The powder particle shaping method according to claim 12, wherein an auxiliary medium for shaping is added to the powder particles.

18. A powder particle producing method, comprising a step of adopting the powder particle shaping method according to claim 8 to shape powder particles.

19. A powder particle producing method, comprising a step of adopting the powder particle shaping method according to claim 9 to shape powder particles.

20. A powder particle producing method, comprising a step of adopting the powder particle shaping method according to claim 10 to shape powder particles.

21. A powder particle producing method, comprising a step of adopting the powder particle shaping method according to claim 11 to shape powder particles.

22. A powder particle producing method, comprising a step of adopting the powder particle shaping method according to claim 12 to shape powder particles.

23. A powder particle producing method, comprising a step of adopting the powder particle shaping method according to claim 13 to shape powder particles.

* * * * *